(12) United States Patent
Murray et al.

(10) Patent No.: US 7,082,339 B2
(45) Date of Patent: Jul. 25, 2006

(54) HOME AUTOMATION SYSTEM

(75) Inventors: Christopher Murray, Baltimore, MD (US); Cory Sorice, Towson, MD (US)

(73) Assignee: Black & Decker Inc., Newark, DE (US)

( * ) Notice: Subject to any disclaimer, the term of this patent is extended or adjusted under 35 U.S.C. 154(b) by 503 days.

(21) Appl. No.: 10/418,022

(22) Filed: Apr. 17, 2003

(65) Prior Publication Data

US 2003/0198938 A1    Oct. 23, 2003

Related U.S. Application Data

(60) Provisional application No. 60/373,348, filed on Apr. 17, 2002.

(51) Int. Cl.
*G05B 15/00* (2006.01)

(52) U.S. Cl. ............... 700/83; 700/9; 700/274; 700/282; 700/65; 700/79

(58) Field of Classification Search ............... 700/83, 700/9, 274, 282, 79, 65; 340/310.01, 310.02, 340/310.04, 310.06, 310.11, 310.12, 310.14, 340/310.16; 434/429, 224, 365, 379, 382
See application file for complete search history.

(56) References Cited

U.S. PATENT DOCUMENTS

| 4,200,862 A | * | 4/1980 | Campbell et al. | ...... 340/310.11 |
| 4,638,299 A | * | 1/1987 | Campbell | .................... 370/501 |
| 4,712,398 A | | 12/1987 | Clarkson et al. | |
| 4,755,792 A | | 7/1988 | Pezzolo et al. | |
| 4,815,202 A | | 3/1989 | Jackson et al. | |
| 4,848,115 A | | 7/1989 | Clarkson et al. | |
| 4,887,442 A | | 12/1989 | Lavelle | |
| 4,902,882 A | | 2/1990 | Lavelle | |
| 5,491,463 A | * | 2/1996 | Sargeant et al. | ....... 340/310.16 |
| 5,579,221 A | * | 11/1996 | Mun | ........................... 700/83 |
| 5,905,442 A | | 5/1999 | Mosebrook et al. | |
| 5,929,748 A | | 7/1999 | Odinak | |
| 5,996,383 A | | 12/1999 | Adelmeyer et al. | |
| 6,091,320 A | | 7/2000 | Odinak | |
| 6,158,259 A | | 12/2000 | Schmitz et al. | |
| 6,331,813 B1 | * | 12/2001 | Belliveau | ............... 340/310.11 |
| 6,532,152 B1 | * | 3/2003 | White et al. | ................. 361/692 |
| 2003/0198938 A1 | * | 10/2003 | Murray et al. | .............. 434/429 |
| 2005/0162273 A1 | * | 7/2005 | Yoon et al. | ............ 340/539.14 |

OTHER PUBLICATIONS

Lutron Homeworks Interactive HWI-HHP-LD Hand-Held Programmer Quick Start Guide (Rev. A May 2002).

(Continued)

*Primary Examiner*—Anthony Knight
*Assistant Examiner*—Thomas Pham
(74) *Attorney, Agent, or Firm*—Harness, Dickey & Pierce, P.L.C.

(57) ABSTRACT

An improved home automation system that permits the user of the system to remotely control the operation of various devices. The system is packaged in a manner that "walks" the user through the initialization process to thereby reduce or eliminate errors associated with the initialization and set-up of the system. Furthermore, the configuration permits the user to initialize the system without the use of tools, such as screwdrivers. The system is configured with improved functionality that permits the user to readily control individual devices and/or selected groups of devices with a powerful hand-held remote transmitter.

8 Claims, 11 Drawing Sheets

OTHER PUBLICATIONS

Lutron Homeworks Interactive HWI-HHP-LD Hand-Held Programmer User's Guide (Rev. A May 2002).

X10.COM Lamp Module LM465 Product Guide (Nov. 2002).

X10.COM Transceiver Module RR501 Installation and Operating Instructions (Nov. 2002).

X10.COM Transceiver TM751 Installation and Operating Instructions (Sep. 2001).

X10.COM KR22A Credit Card Controller Installation and Operating Instructions (Sep. 2001).

\* cited by examiner

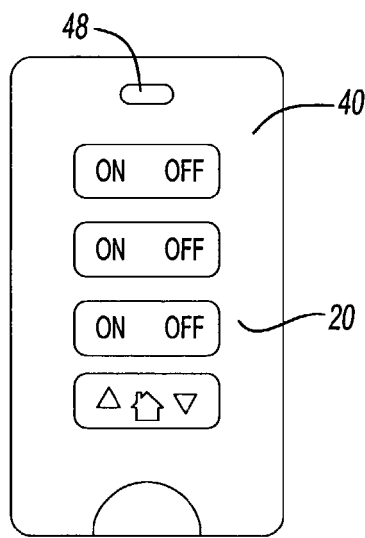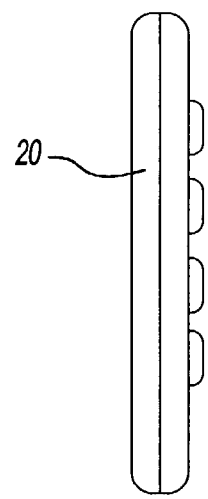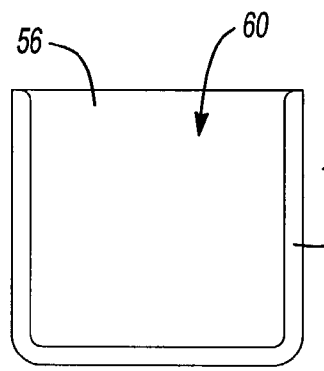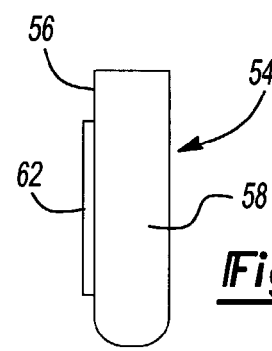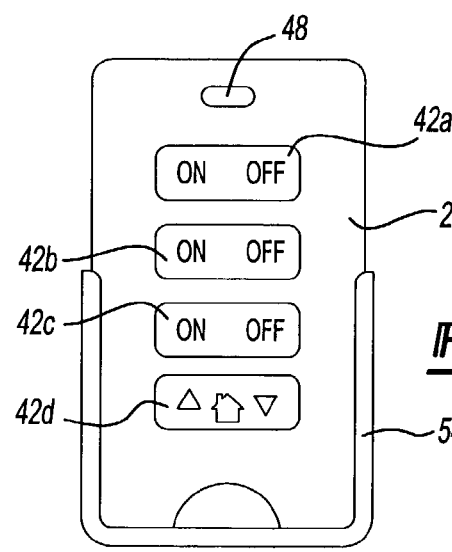

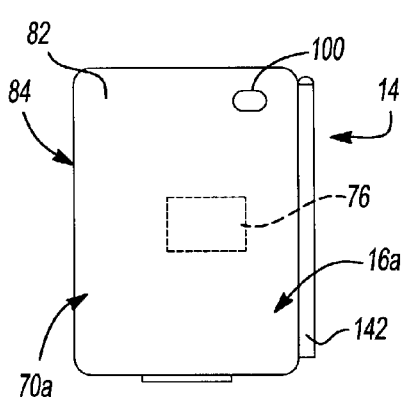
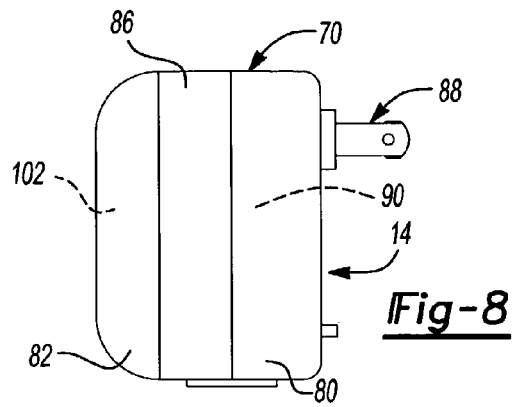
Fig-7
Fig-8
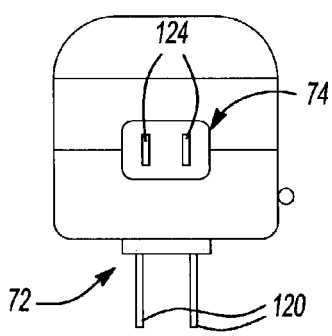
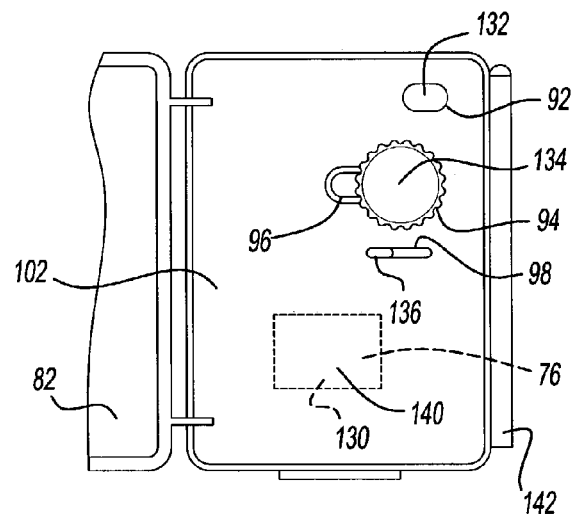
Fig-9
Fig-10
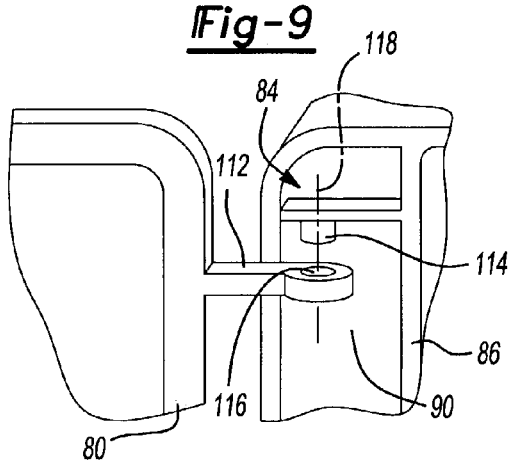
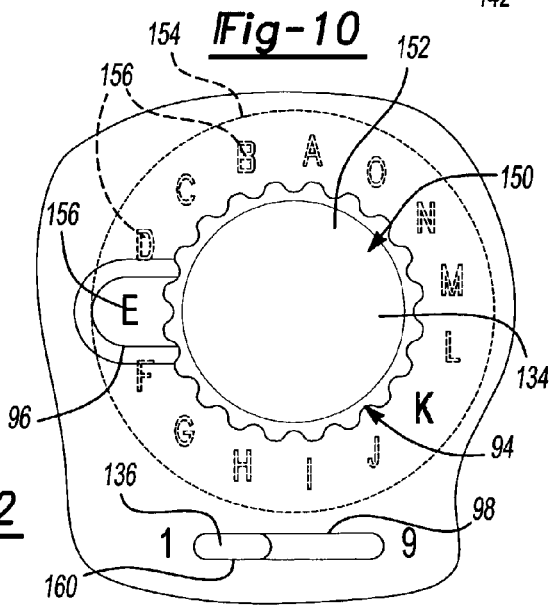
Fig-11
Fig-12

HOME AUTOMATION SYSTEM

CROSS-REFERENCE TO RELATED APPLICATIONS

This application claims the benefit of U.S. Provisional Patent Application No. 60/373,348 filed Apr. 17, 2002 entitled "Home Automation System".

FIELD OF THE INVENTION

The present invention generally relates to the control of electrical devices and more particularly to the control of electrical devices from remote locations using electrical power wiring.

BACKGROUND OF THE INVENTION

Due to the plethora of specialty stores, publications and television programs that are related to home improvement, renovation and construction, modern consumers are increasingly aware of advancements in technologies relating to the maintenance and operation of homes. One increasingly popular trend in home technology concerns home automation wherein various electrical devices (e.g., lights, stereos) and/or security devices (e.g., motion sensors, alarms) are integrated into a house. Automation systems that are incorporated into newly constructed homes generally tend to utilize one or more discrete systems of control wires that facilitate communication between a controller and the electrical and/or security devices.

When an automation system is to be integrated into an existing house, the installation of a discrete set of control wires can be very complicated and costly, particularly if portions of the house, such as walls and ceilings, become damaged during the installation of the control wires. In view of these difficulties, many products have been developed which utilize the existing AC power distribution wires to facilitate communication between a controller and the electrical and/or security devices. These products typically modulate a control signal over the power wires at a frequency that is well above the conventional 60 Hz frequency of AC electrical power that is carried by the power wires.

The protocol known as "X10" is a common protocol for providing communications between a controller and electrical and security devices over electrical power wires. The X10 signal is composed of a series of 5 volt, 121 kHz pulses having duration of 1 millisecond, positioned at zero crossings of the 60 Hz AC electrical power. Each pulse corresponds to a binary 1, and the absence of a pulse corresponds to a binary 0. A single X10 command or message consists of a 22 bit word that is obtained from eleven complete cycles of the AC electrical power. All X10 receivers that are electrically coupled (i.e., plugged into) the AC electrical power will receive all of the messages that are transmitted over the AC power wires. The receipt of a message by a receiver, however, will not automatically initiate a response in the receiver. In this regard, each message that is transmitted over the AC power lines carries a receipt address and only the X10 receivers whose address matches the receipt address will respond to a message.

While such X10 automation systems are relatively inexpensive and reliable, several drawbacks of the heretofore known X10 automation systems have been identified. One such drawback relates to the set-up of a typical X10 automation system which has been identified by some consumers as being confusing and difficult. In this regard, it is to be noted that up to 256 different addresses may be available in a given home automation system and that the receipt address in the message transmitted by the transmitting device (e.g., the controller) must match the address of the receiving device (e.g., a lamp switch) to permit the receiving device to be controlled in a desired manner. Furthermore, tools, such as screwdrivers, are routinely required to manipulate the switches of the various components of the known home automation systems to set the address of the component to a desired address. Moreover, while all of the known home automation systems include installation directions, their components are not packaged in a manner that renders the installation of their components intuitively obvious so that typical home consumers.

Another drawback concerns the overall appearance of the components of the known X10 automation systems. In this regard, many of the available home automation systems include components having a housing with one or more apertures through which extend addressing switches. The presence of the switches, as well as their labeling, provides the component with an appearance that may not be desirable to the homeowner.

Yet another drawback concerns the relative robustness of the components of the known X10 automation systems. In this regard, the components are generally rated for inside use and are not subjected to the temperature extremes and moisture that are commonly experienced by electrical and security devices that are found or used out of doors.

SUMMARY OF THE INVENTION

In one preferred form, the present invention provides an improved home automation system having a clean and aesthetically pleasing appearance.

In another preferred form, the present invention provides an improved home automation system that is packaged in a manner that renders the process of initializing the home automation system more intuitively obvious.

In another preferred form, the present invention provides an improved home automation system that is configured in a manner that renders its operation more intuitively obvious.

In a further preferred form, the present invention provides an improved home automation system that is suited for both indoor and outdoor use.

In yet another preferred form, the present invention provides an improved home automation system that includes a hand-held remote transmitter that permits individual devices and/or pre-selected groups of devices to be remotely controlled by the user of the system.

In still another preferred form, the present invention provides an improved home automation system that may be initialized without the use of tools.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

FIG. 2 is a front elevational view of a portion of the home automation system of FIG. 1 illustrating the hand-held transmitter in greater detail;

FIG. 3 is a side view of the hand-held transmitter;

FIG. 4 is a front elevational view of a portion of the home automation system of FIG. 1 illustrating the mounting cradle in greater detail;

FIG. 5 is a left side elevational view of the mounting cradle;

FIG. 6 is a front elevational view of the hand-held transmitter as received into the mounting cradle;

FIG. 7 is a front elevational view of a portion of the home automation system of FIG. 1 illustrating the messenger hub in greater detail;

FIG. 8 is a right elevational view of the messenger hub;

FIG. 9 is a bottom plan view of the messenger hub;

FIG. 10 is a front elevational view of a portion of the messenger hub illustrating the housing cover in an opened condition;

FIG. 11 is a partially exploded and broken away view of the messenger hub illustrating the hinge mechanism in greater detail;

FIG. 12 is an enlarged portion of FIG. 10, illustrating the control address selector and the switch address selector in greater detail;

DETAILED DESCRIPTION OF THE PREFERRED EMBODIMENTS

Figure 1:
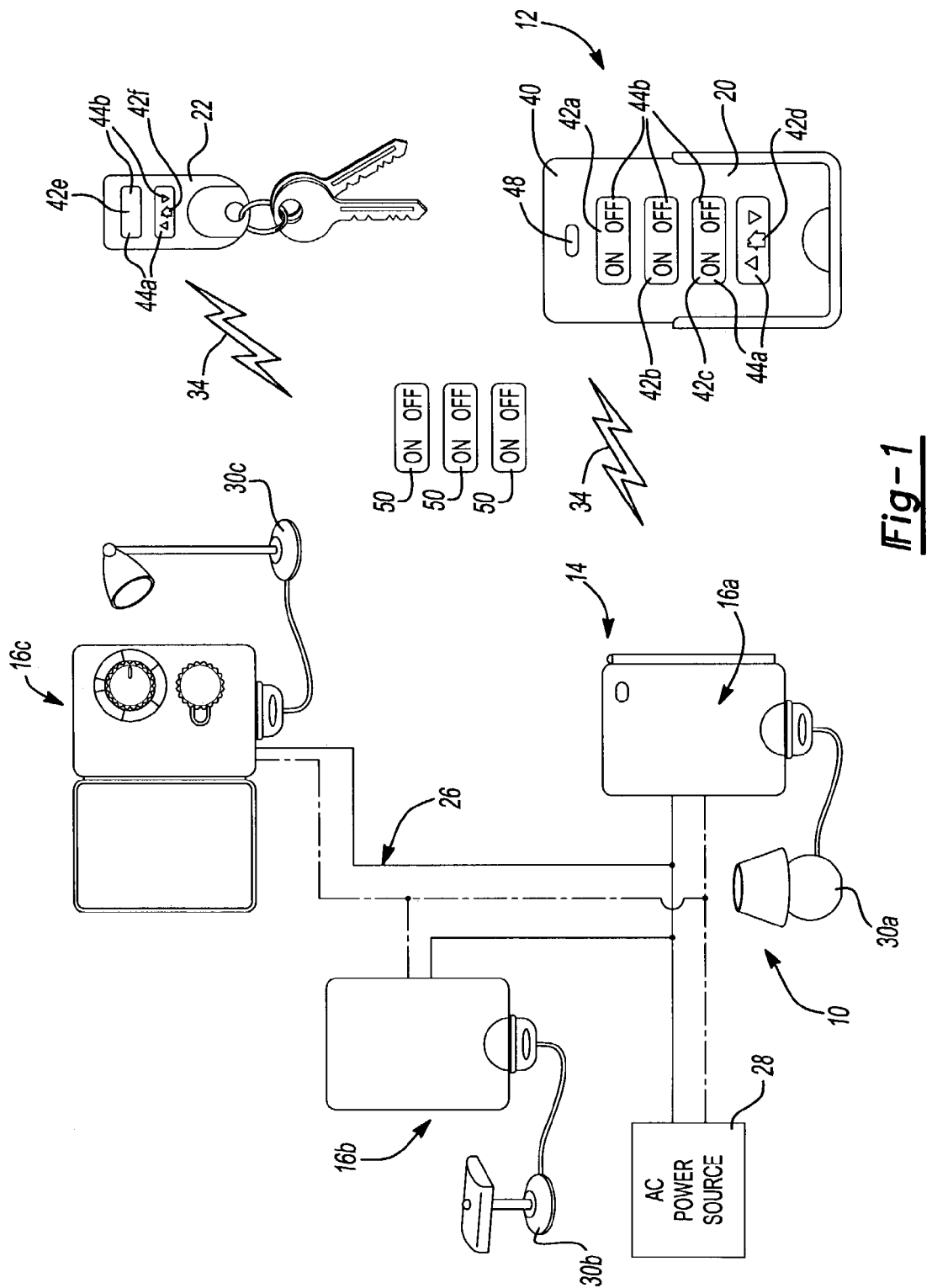
FIG. 1 is a schematic illustration of a home automation system constructed in accordance with the teachings of the present invention.
Figure 13:
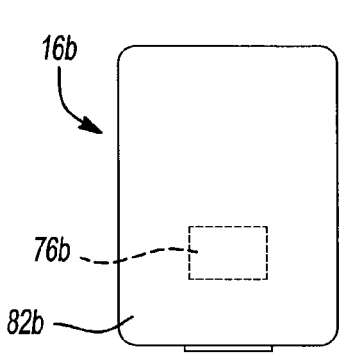
FIG. 13 is a front elevational view of a portion of the home automation system of FIG. 1 illustrating a switch in greater detail.
Figure 14:
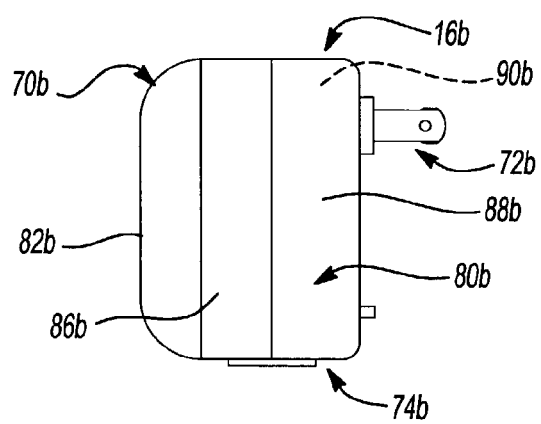
FIG. 14 is a right side elevational view of the switch.
Figure 15:
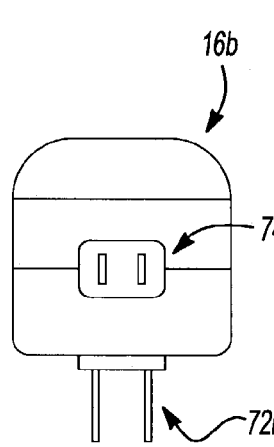
FIG. 15 is a bottom plan view of the switch.
Figure 16:
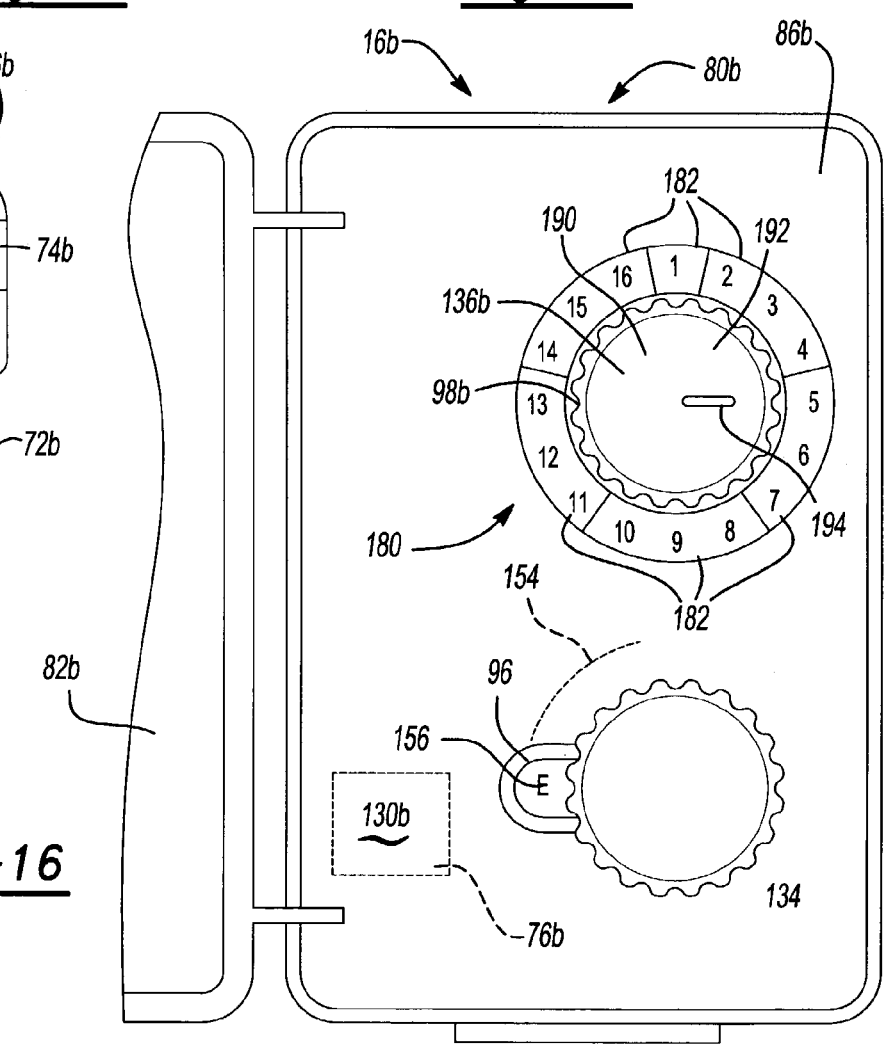
FIG. 16 is a front elevational view of the switch illustrating the housing cover in an opened condition.

With reference to FIG. 1 of the drawings, a home automation system constructed in accordance with the teachings of the present invention is generally indicated by reference numeral 10. The home automation system 10 is illustrated to include a plurality of remote transmitters 12, a messenger hub 14 and a plurality of switches (e.g., switches 16a, 16b and 16c). The remote transmitters 12 include a hand-held transmitter 20 and a key fob transmitter 22. The home automation system 10 is illustrated in conjunction with a power wire system 26 that provides AC electrical power from an AC power source 28 to the home automation system 10, as well as various electrical devices, such as lamps 30a, 30b and 30c.

The hand-held transmitter 20 is conventionally operable for transmitting a plurality of a radio frequency (RF) signals 34 to communicate an RF command to the messenger hub 14. In the particular embodiment illustrated, the hand-held transmitter 20 includes a housing 40 that houses four keys 42a, 42b, 42c and 42d, each of which include two function switches 44a and 44b. Each of the function switches 44a and 44b permit a key to be associated with two different functions. Those skilled in the art will appreciate in view of this disclosure that the hand-held transmitter 20 and the messenger hub 14 may be configured to communicate via any suitable form of electromagnetic wave communication. In the particular embodiment provided, each key 42a, 42b, 42c and 42d is analogous to a dimmer switch, with the function switches 44a and 44b being associated with function commands that are intended to progressively increase or reduce, respectively, the power that is output from an associated switch. Accordingly, a lamp that is plugged into the switch would increasingly illuminate or dim in response to the actuation of the function switches 44a and 44b, respectively, of the key that is associated with the switch.

Keys 42a, 42b and 42c are programmable and permit the user of the home automation system 10 to assign both a requested controller address and a requested device address to a given one of the keys 42a, 42b and 42c such that when one of the function switches 44a and 44b is pressed, the handheld transmitter will generate an RF command 34 that includes the requested controller address for that particular key, the requested device address for that particular key, and a function command (e.g., progressively dim or progressively illuminate by controlling the amount of power that is output from the switches 16a, 16b and 16c) that is associated with the function switch.

In the particular embodiment provided, the key 42d is also programmable, but only permits the user of the home automation system 10 to assign a requested controller address. When one of the function switches 44a or 44b for the key 42d is pressed, the hand-held transmitter will generate an RF command 34 that includes the requested controller address, along with a function command that indicates to the messenger hub 14 that all of the switches 16a, 16b and 16c should be progressively dimmed or illuminated, respectively.

Those skilled in the art will appreciate that the requested controller address need not be the same for each of the keys 42a, 42b, 42c and 42d, for example, if the home automation system 10 included more than one messenger hub 14, as will become apparent from the discussion below. Those skilled in the art will also appreciate that the keys 42a, 42b, 42c and 42d and their function switches 44a and 44b may be configured somewhat differently. For example, the function switches 44a and 44b may be configured in a toggle style, wherein the function switch 44a is associated with an "on" (i.e., powered) function or condition and the function switch 44b is associated with an "off" (i.e., unpowered) function or condition. Alternatively, each function switch 44a and 44b may be configured to generate a function command that is specific to a particular one of the switches 16a, 16b and 16c. In this latter embodiment, the messenger hub 14 may respond to a function command by controlling an associated one of the switches 16a, 16b and 16c to toggle between a powered and an unpowered condition, or to progressively increase or decrease the power that is output from the associated one of the switches 16a, 16b and 16c until a maximum or minimum power level, respectively, has been achieved and there after fully decreasing or increasing, respectively, the power that is output from the associated one of the switches 16a, 16b and 16c to a minimum or maximum power level, respectively.

The keys 42a, 42b, 42c and 42d are programmed in a conventional manner and as such, details concerning the programming of the hand-held transmitter need not be discussed in detail herein. Briefly, a programming mode, which is indicated by the illumination of a light 48 on the hand-held transmitter 20, is entered by actuating the function switches 44a and 44b of the keys 42a, 42b, 42c and 42d in a predetermined manner. The programming mode permits the user of the home automation system 10 to program a requested controller address for each of the keys 42a, 42b, 42c and 42d, as well as a requested device address for each of the keys 42a, 42b and 42c. Optionally, the function switches 44a and 44b for the keys 42a, 42b, 42c and/or 42d may also be programmable, such that the user of the home automation system 10 may assign a desired function command to each of the function switches 44a and 44b.

A key cover 50 is provided for each of the keys 42a, 42b and 42c, which permits the user of the home automation system 10 to readily correlate each key 42a, 42b and 42c to a particular switch. Each key cover 50 is formed from a flexible plastic material that is contoured to snap-fit onto and matingly engage one of the keys 42a, 42b and 42c. The key cover 50 is not provided for key 42d as key 42d is associated with the operation of all of the switches in the embodiment illustrated.

In the particular example provided, each key cover 50 is differently colored (e.g., yellow, red, blue), which permits the user of the home automation system 10 to associate each of the switches 16a, 16b and 16c, or the room in which each of the switches 16a, 16b and 16c is located, with a particular color. In our experience and testing, we have found that users of the home automation system 10 have less difficulty associating a switch (or the room in which the switch is located) with a color as compared with the alpha and/or numeric identifiers that are employed to program the transmitters and switches.

With reference to FIGS. 2 through 6, the housing 40 of the handheld transmitter 20 provided in this example is relatively thin and flat, which provides the hand-held transmitter 20 with the appearance of a conventional switch or outlet plate. A mounting cradle 54 is provided for the hand-held transmitter 20, which permits the hand-held transmitter 20 to be mounted in a convenient and accessible place. The mounting cradle 54 includes a planar rear wall 56 and a side wall 58 that bounds the bottom and portions of the left and right sides of the planar rear wall 56. The planar rear wall 56 and the side wall 58 cooperate to form a transmitter cavity 60 into which the hand-held transmitter 20 may be removably placed. The side wall 58 is configured to wrap around the housing 40 of the hand-held transmitter 20, but may alternatively engage slots (not shown) that are formed into the sides of the housing 40.

Conventional threaded fasteners, which extend through the planar rear wall 56, or preferably adhesives, such as an adhesive tape 62 that is applied to the planar rear wall 56, may be employed to mount the mounting cradle 54 at a desired location. Those skilled in the art will appreciate that the mounting cradle 54 may be positioned in a manner such that the hand-held transmitter 20, when mounted in the mounting cradle 54, will have the appearance of a switch plate. Those skilled in the art will also appreciate that the mounting cradle 54 may be used in place of a switch plate (not shown) for covering an electrical switch box (not shown), as for example, in situations where a conventional toggle or dimmer switch (not shown) had been mounted in the electrical switch box and was used to toggle or otherwise control the power that was transmitted to a wall outlet (not shown). In this example, the toggle or dimmer switch may be removed such that the wall outlet is wired hot (i.e., wired to continuously receive electrical power from the power wire system 26) and thereafter an electrical device, such as a floor lamp (not shown) that is coupled to the wall outlet is controlled via one of the switches 16a, 16b and 16c of the home automation system 10.

Returning to FIG. 1, the key fob transmitter 22 is configured in a manner that is similar to the hand-held transmitter 20 and as such, need not be discussed in significant detail herein. The key fob transmitter 22 includes only two keys 42e and 42f. The key 42e is identical to the keys 42a, 42b and 42c in that it is programmable (i.e., requested controller address and requested device address) and includes two function switches 44a and 44b. The key 42f is identical to the key 42d and in that it is also programmable (i.e., requested controller address).

With reference to FIGS. 1 and 7 through 12, the messenger hub 14 is illustrated to include a housing 70, a power input portion 72, an optional power output portion 74 and a controller 76. The optional power output portion 74 permits the switch 16a to be integrated with the messenger hub 14 at a relatively low cost, since elements that are similar to the housing 70, the power input portion 72, and the controller 76 are employed in the switches 16b and 16c and these elements are easily configured for and are not over utilized by the incorporation of the switch 16a into the messenger hub 14.

The housing 70 includes a housing assembly 80 and a housing cover 82, which is hingedly coupled to the housing assembly 80 via a hinge 84. The housing assembly 80 includes a first housing shell 86 and a second housing shell 88 that cooperate to form a cavity 90 into which the power input portion 72, the power output portion 74 and the controller 76 are housed. The first and second housing shells 86 and 88 are injection molded from a suitable plastic. In the particular example provided, the first housing shell 86 is shown to include a power button aperture 92, a controller knob aperture 94, a controller address window 96 and an optional switch aperture 98, all of which will be discussed in more detail below. The housing cover 82, which includes a power button window 100 cooperates with the first housing shell 86 to define an intermediate cavity 102. The hinge 84 may be any appropriate hinge, including a living hinge or a piano wire hinge. In the particular embodiment illustrated, the hinge 84 includes a pair of first hinge tabs 110 and a pair of second hinge tabs 112. The first hinge tabs 110 are integrally formed with the first housing shell 86 and extend inwardly into the cavity 90. A spherical protrusion 114 is formed on the distal end of each of the first hinge tabs 110. The second hinge tabs 112 are integrally formed with the housing cover 82, extending rearwardly from the front surface of the housing cover 82. A spherical recess 116 is formed into the distal end of each of the second hinge tabs 112. The first and second hinge tabs 110 and 112 are coupled to one another such that the spherical protrusion 114 is seated in the spherical recess 116 to thereby define a hinge axis 118 about which the housing cover 82 is pivotably coupled to the housing assembly 80. As those skilled in the art will appreciate, the hinge 84 is preferably configured such that the hinge axis 118 is concealed by the housing cover 82 when the housing cover 82 is closed against the housing assembly 80 to thereby provide the messenger hub 14 with a "clean" overall appearance.

The power input portion 72 includes a pair of conventional spade terminals 120 that are configured to matingly engage the female terminals of a conventional wall outlet (not shown) to permit the messenger hub 14 to be electrically coupled to the power wire system 26. The power output portion 74 includes a pair of female terminals 124 that permits an electrical and/or security device, such as a lamp 30a, to be electrically coupled to and controlled by the messenger hub 14. The power input and output portions 72 and 74 are coupled to the controller 76 and the controller 76 selectively controls the transmission of electrical power to the power output portion 74.

The controller 76 includes a control unit 130, a power button 132, a controller address selector 134 and an optional switch address selector 136. The control unit 130 is conventionally configured and is operable for generating a message, for example using the X10 protocol, that is transmitted through the power input portion 72 and over the power wire system 26. Optionally, the control unit 130 is also conventionally operable for receiving messages (in a suitable protocol such as the X10 protocol) that are transmitted over the power wire system 26 received through the power input portion 72. The control unit 130 also conventionally includes an RF receiver 140 that is configured to receive RF commands 34 from the hand-held transmitter 20 and the key fob transmitter 22. The RF receiver 140 includes an antenna 142, which may be located within the cavity 90, or coupled to the housing 70 in an externally extending (telescoping) manner as is illustrated in FIGS. 1, 7 and 10.

The power button 132 is electrically coupled to the control unit 130 and is operable for cycling or toggling power to the control unit 130. The power button 132 preferably includes an internal illumination device (not specifically shown), such as an LED, which lights when the power button 132 is positioned in a manner that provides electrical power to the control unit 130. The power button 132 extends through the power button aperture 92 in the first housing shell 86, which permits it to be manipulated when the housing cover 82 is pivoted away from the housing assembly 80. The power button 132 is aligned to the power button window 100 when the housing cover 82 is closed against the housing assembly 80 and permits the user of the home automation system 10 to determine the status of the control unit 130 (i.e., off or on) without opening the housing cover 82 (since the power button 132 is illuminated).

The controller address selector 134 is a multi-position binary switch that is illustrated to include a rotary knob 150 having a knob portion 152 and a flange portion 154. The knob portion 152 extends through the controller knob aperture 94 and into the intermediate cavity 102, where it is accessible to the user of the home automation system 10 when the housing cover 82 is opened. The flange portion 154 extends around the perimeter of the knob portion 152 and includes a plurality of controller address indicia 156 (i.e., letter A through O), each of which corresponding to a predetermined controller address. The flange portion 154 is positioned in the cavity 90 such that the controller address indicia 156 to which the controller address selector 134 is set will be the only one of the controller address indicia 156 to show through the controller address window 96. As is apparent from the construction of the particular knob 150 that is illustrated, the user is able to adjust the rotational position of the knob 150 with their thumb and fingers and as such, no tools, such as screwdrivers, are needed for setting the position of the knob 150.

The switch address selector 136 is a multi-position binary switch that assigns a device address to the control unit 130. In the particular embodiment illustrated, the switch address selector 136 includes a slider switch 160 that permits the switch address selector 136 to be positioned in one of two discrete positions (i.e., device address 1 or device address 9) to thereby permit the user of the home automation system 10 to assign the power output portion 74 one of two different device addresses.

In the example provided, the power output portion 74 in normally maintained in an unpowered condition, wherein electrical energy is not transmitted thereto from the power wire system 26. When an RF command 34 is generated by one of the remote transmitters 12 to enable the transmission of electrical power to the power output portion 74, the control unit 130 enables power transmission to the power output portion 74, as well as generates a message having a receipt address that includes its controller address and the device address of the switch 16a. The message is transmitted through the power input portion 72 to the power wire system 26 and is thereafter received by the switches 16b and 16c. Any of the switches 16b and 16c that are configured to respond to a message having a receipt address that includes a controller address and a device address that are identical to the controller address of the messenger hub 14 and the device address of the switch 16a will respond in a manner similar to that of the power output portion 74 of the messenger hub 14 (i.e., the switch 16a). A more detailed description of the transmission of RF commands 34 and messages over the power wire system 26 may be found in U.S. Pat. No. 4,755,792 entitled "Security Control System" and assigned to Black & Decker Inc., which is hereby incorporated by reference as if fully set forth herein.

With reference to FIGS. 1 and 13 through 16, the switches 16b and 16c are shown to be constructed in a manner that is similar to that of the messenger hub 14 but are physically smaller in size than the messenger hub 14. As switches 16b and 16c are identically configured, only switch 16b will be discussed in detail. The switch 16b includes a housing 70b, a power input portion 72b, a power output portion 74b and a controller 76b. The power input portion 72b and the power output portion 74b are generally identical to the power input portion 72 and the power output portion 74, respectively, and as such, need not be discussed in further detail.

The housing 70b, like the housing 70, includes a housing assembly 80b, with a first housing shell 86b and a second housing shell 88b, and a housing cover 82b. The second housing shell 88b and the housing cover 82b are identical to the second housing shell 88 and the housing cover 82 (FIG. 8), and as such, will not be discussed in further detail. The first housing shell 86b is generally similar to the first housing shell 86 (FIG. 8), except that the first housing shell 86b includes a switch aperture 98b is configured somewhat differently than the switch aperture 98 (FIG. 12), a switch scale 180 has been added proximate the switch aperture 98b and a power button aperture is not present. The switch aperture 136b and the switch scale 180 will be discussed in greater detail below.

The controller 76b includes a control unit 130b, the controller address selector 134 and a switch address selector 136b. The control unit 130b is conventionally configured and is operable for receiving messages that are transmitted over the power wire system 26 to the power input portion 72b. The controller address selector 134 is configured in an identical manner as the controller address selector 134 of the messenger hub 14. In this regard, the flange portion 154 of the controller address selector 134 is housed in the cavity 90b such that the controller address indicia 156 to which the controller address selector 134 is set will be the only one of the plurality of controller address indicia 156 to show through the controller address window 96 in the first housing shell 86b.

The switch address selector 136b, like the switch address selector 136, is a multi-position binary switch that assigns a device address to the switch 16b. In the particular embodiment illustrated, the switch address selector 136b is a rotary knob 190, having a knob portion 192 with a setting indicia 194 marked thereon. The setting indicia 194 is illustrated to be a radially outwardly projecting line, but those skilled in the art will understand that any setting indicia, including an arrow formed into the perimeter of the knob portion 192, may additionally or alternatively be employed. In the example provided, the switch address selector 136b is rotatable between 16 different positions (numbered 1 through 16) and thereby permits the user of the home automation system 10 to assign the switch 16b one of 16 different device addresses. As is apparent from the construction of the particular knob 190 that is illustrated, the user is able to adjust the rotational position of the knob 190 with their thumb and fingers and as such, no tools, such as screwdrivers, are needed for setting the position of the knob 190.

The switch scale 180 is illustrated to be sectioned into a plurality of differently colored sectors 182, with each of the colored sectors 182 being associable with a corresponding colored key cover 50. Adjustment of the switch address selector 136b to a position within a particular color-coded sector 182 does not automatically link or program a particular key to the switch 16b, but rather may be used to provide the user of the home automation system 10 with a means of visually associating the switch 16b with a particular key on the transmitters 12.

As with the power output portion 74 of the messenger hub 14, the power output portion 74b of the switch is normally maintained in an unpowered condition, wherein electrical energy is not transmitted to the power output portion 74b from the power wire system 26. When an RF command 34 is generated by one of the remote transmitters 12 to enable the transmission of electrical power to the power output portion 74b of a desired switch (e.g., switch 16b), the control unit 130 of the messenger hub 14 generates a message having a receipt address that includes the controller address and a preprogrammed device address. The message is transmitted over the power wire system 26 to the power input portion 72b where it is received by the control unit 130b of the switch 16b. If the receipt address of the message includes a controller address that corresponds to a controller address to which the controller address selector 130b of the switch 16b is set and a device address that corresponds to a device address to which the switch address selector 136b of the switch 16b is set, the control unit 136b will enable the transmission of electrical power to the power output portion 74b of the switch 16b. Similarly, any of the other switches that are configured to respond to a message having a receipt address that includes a controller address and a device address that are identical to the controller address and the device address of the switch 16b will respond in a manner similar to that of the switch 16b.

Prior to the operation of the home automation system 10, the messenger hub 14, the switches 16a, 16b and 16c, the hand-held transmitter 20 and the key fob transmitter 22 must be programmed in a consistent manner. While the home automation system 10 need be set up in no particular order, the user may set up the home automation system 10 as follows:

a) the controller address selector 134 of the messenger hub 14 is set to a desired controller address, such as "E";

b) the switch address selector 136 of switch 16a is set to a desired device address, such as 1;

c) the controller address selector 134 of switch 16b is set to the desired controller address to correspond to the controller address selector 134 of the messenger hub 14 (i.e., the controller address selector 134 of switch 16b is set to "E" in this example);

d) the switch address selector 136b of switch 16b is set to a second desired device address, such as 9;

e) the controller address selector 134 of switch 16c is set to the desired controller address to correspond to the controller address selector 134 of the messenger hub 14 (i.e., the controller address selector 134 of switch 16c is set to "E" in this example);

f) the switch address selector 136b of switch 16c is set to a third desired device address, such as 5;

g) the key 42a of the hand-held transmitter 20 is programmed with a desired controller address that corresponds to the controller address selector 134 of the messenger hub 14 (i.e., the requested controller address of the key 42a is programmed to "E" in this example);

h) the key 42a of the hand-held transmitter 20 is programmed with a desired device address that corresponds to the device address of the switch 16a (i.e., the requested device address of the key 42a is programmed to "1" in this example);

i) the key 42b of the hand-held transmitter 20 is programmed with a desired controller address that corresponds to the controller address selector 134 of the messenger hub 14 (i.e., the requested controller address of the key 42a is programmed to "E" in this example);

j) the key 42b of the hand-held transmitter 20 is programmed with a desired device address that corresponds to the device address of the switch 16b (i.e., the requested device address of the key 42b is programmed to "9" in this example);

k) the key 42c of the hand-held transmitter 20 is programmed with a desired controller address that corresponds to the controller address selector 134 of the messenger hub 14 (i.e., the requested controller address of the key 42c is programmed to "E" in this example);

l) the key 42c of the hand-held transmitter 20 is programmed with a desired device address that corresponds to the device address of the switch 16c (i.e., the requested device address of the key 42c is programmed to "5" in this example);

m) key covers 50, which correspond to the switch to which the key is associated, are assigned and matingly engaged to each of the keys 42a, 42b and 42c (e.g., as the switch address selector of switches 16a, 16b and 16c, are set to 1, 9 and 5, respectively, and as the 1, 9 and 5 device addresses lie within the boundaries of the red, yellow and blue colored indicia, respectively, on the switch scale 180, the key covers 50 for the keys 42a, 42b and 42c are red, yellow and blue, respectively);

n) the key 42d of the hand-held transmitter 20 is programmed with a desired controller address that corresponds to the controller address selector 134 of the messenger hub 14 (i.e., the requested controller address of the key 42d is programmed to "E" in this example);

o) the key 42e of the key fob transmitter 22 is programmed with a desired controller address that corresponds to the controller address selector 134 of the messenger hub 14 (i.e., the requested controller address of the key 42e is programmed to "E" in this example);

p) the key 42e of the key fob transmitter 22 the key 42c of the hand-held transmitter 20 is programmed with a desired device address that corresponds to the device address of any one of the switches 16a, 16b and 16c that the user of the home automation system 10 desires to control with the key fob transmitter 22 (in this example, the requested device address of the key 42e is set to "5", which permits the user of the home automation system 10 to control the switch 16c with the key fob transmitter 22);

q) the key 42f of the key fob transmitter 22 is programmed with a desired controller address that corresponds to the controller address selector 134 of the messenger hub 14 (i.e., the requested controller address of the key 42f is programmed to "E" in this example); and r) appropriate electrical devices, which are lamps 30a, 30b and 30c in the example provided, are electrically coupled to the switches 16a, 16b and 16c, respectively.

Figure 17:
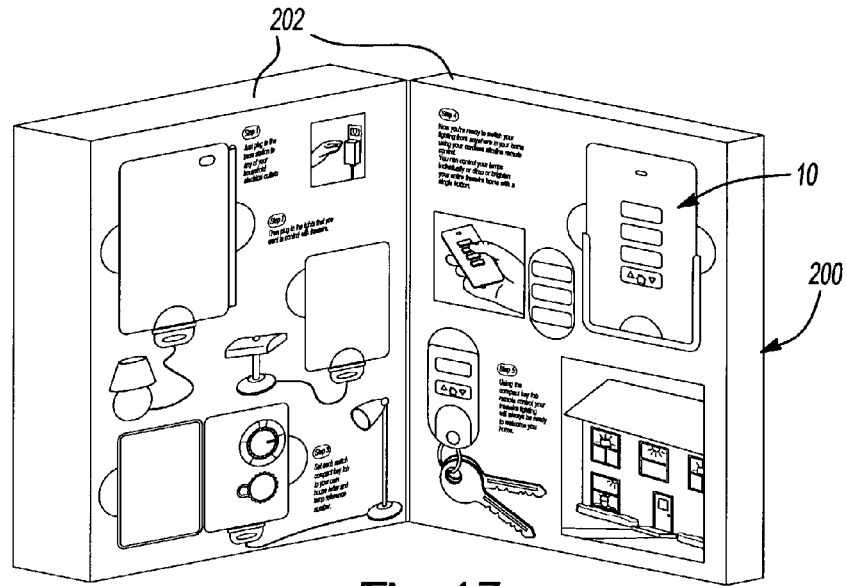
FIG. 17 is a perspective view of the home automation system of FIG. 1 as packaged in accordance with the teachings of the present invention.
Figure 18:
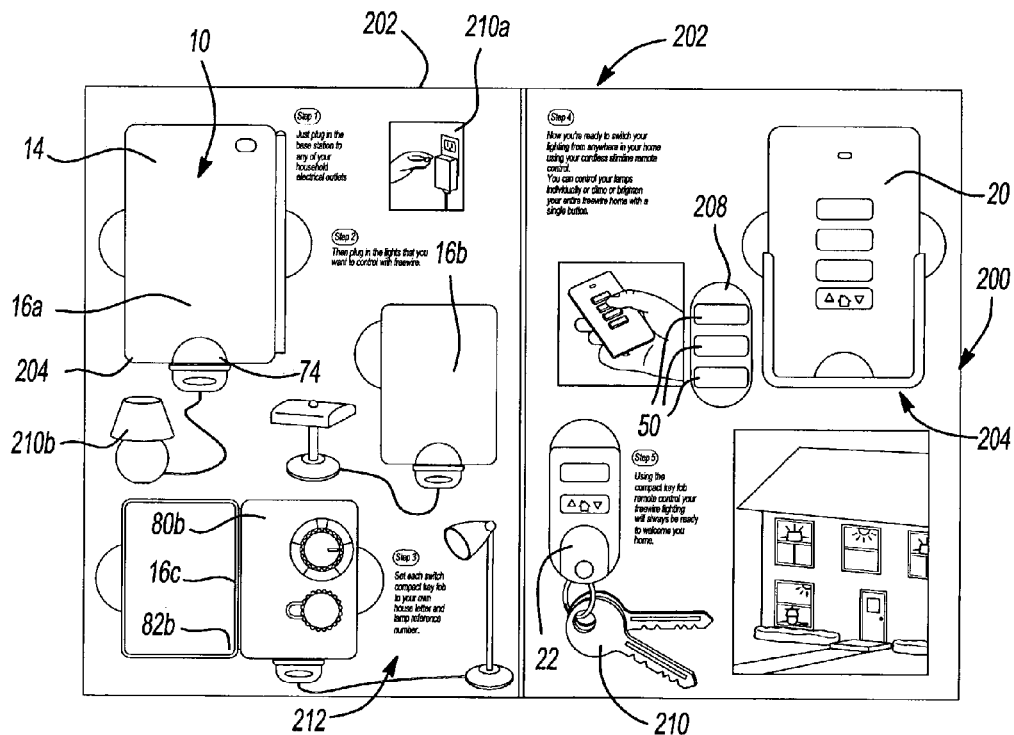
FIG. 18 is a front elevational view of the home automation system and packaging of FIG. 17, illustrating the packaging with the covers in an open condition.

The set-up or initialization of the home automation system 10 is rendered more intuitively obvious through its packaging 200 as shown in FIGS. 17 and 18. The packaging 200 is provided in a book-like format with opposite covers 202. At least one of the covers 202 is formed to include a plurality of cavities or wells 204, with each of the wells 204 being configured to receive an associated one of the messenger hub 14, the switches 16b and 16c, the handheld transmitter 20, the key fob transmitter 22 and the key covers 50. The wells 204 are also shown to include one or more finger recesses 208 that are configured in a manner that permits a person's finger or thumb to be inserted therein and engage an edge of the article in the well 204 so that the article may be more easily removed from the well 204.

Illustrations 210 are preferably provided in the area proximate each well 204 to provide the installer with a visual indication of how the component is to be used and/or installed. For example, the illustrations 210a and 210b proximate the messenger hub 14 provide the installer with visual indications of how the messenger hub 14 is to be installed (i.e., plugged into a desired wall outlet) and how the switch 16a is to be used (i.e., an electrical device, such as a lamp, is plugged into the power outlet portion 74).

Text instructions 212 are preferably included with the illustrations 210. The text instructions 212 are not meant to completely eliminate detailed instructions for initializing the home automation system 10, but rather to give a short synopsis of each step in the initializing process. In situations where the setting of the controller address or the device address of a component is discussed, the well 204 associated with these text instructions 212 is preferably enlarged so as to permit the housing cover of the component (e.g., housing cover 82b of switch 16c) to be positioned in an opened condition relative to the housing assembly (e.g., housing assembly 80b) of the component.

Figure 19:
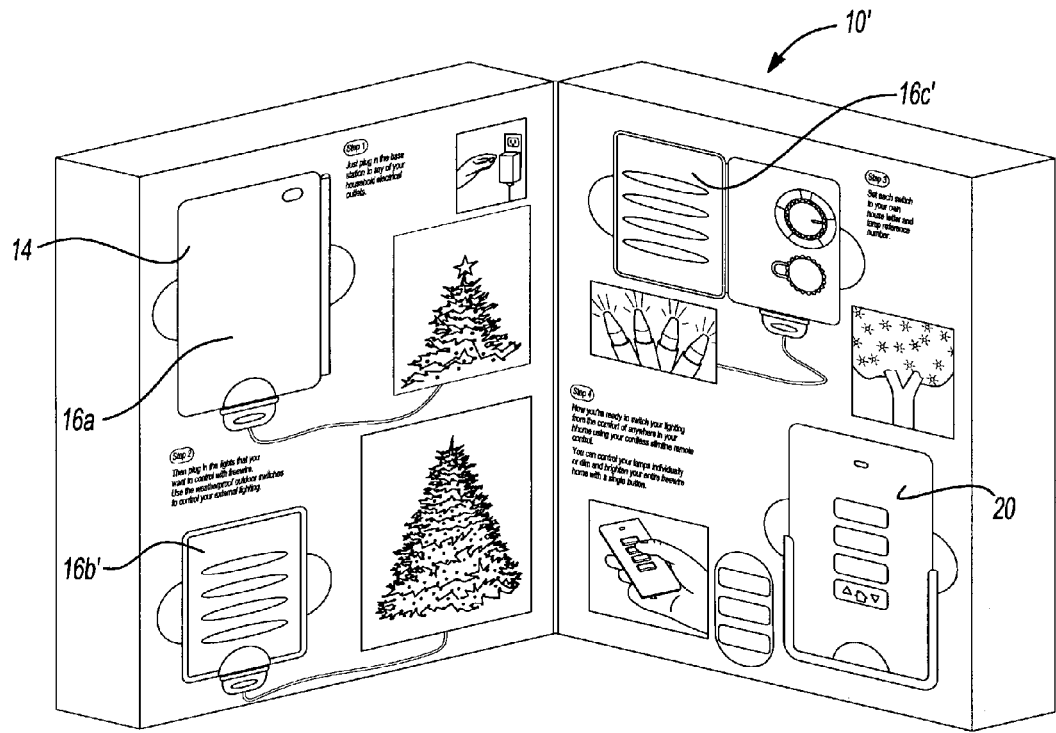
FIG. 19 is a perspective view of the home automation system constructed in accordance with the teachings of another preferred embodiment of the present invention, the home automation system being illustrated in a packaged condition.
Figure 20:
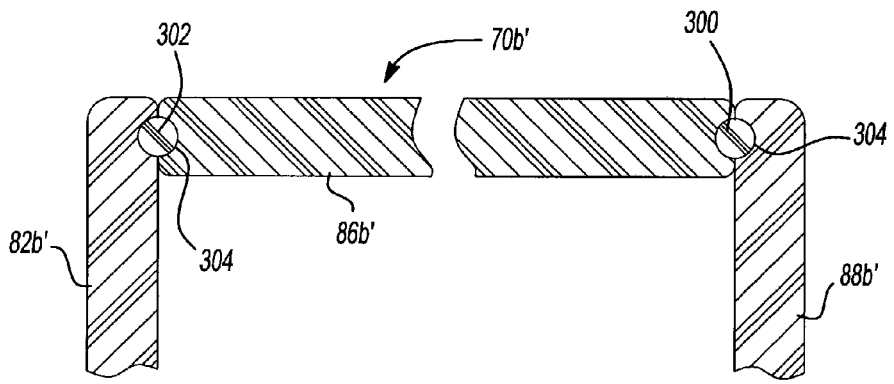
FIG. 20 is a sectional view of a portion of one of the switches of the home automation system of FIG. 19.
Figure 21:
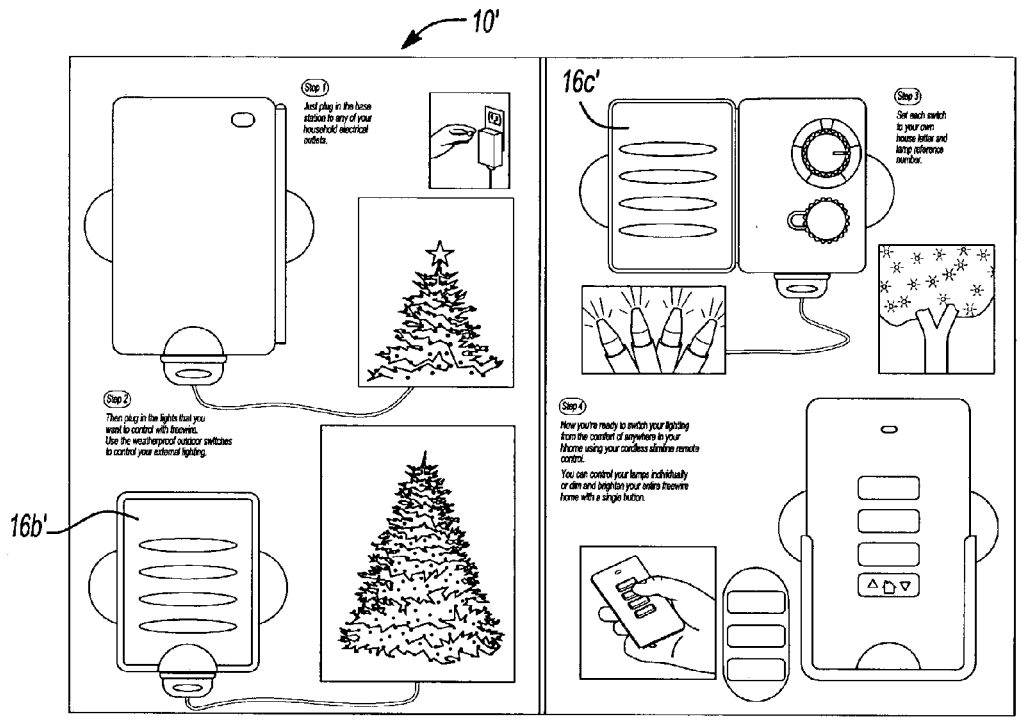
FIG. 21 is a front elevational view of the home automation system of FIG. 19 as packaged in accordance with the teachings of the present invention.

While the home automation system 10 has been described thus far as being manually actuated and utilized in an entirely indoor environment, those skilled in the art will appreciate that the invention, in its broader aspects, may be constructed somewhat differently. For example, the home automation system 10' may be configured in a manner that permits both indoor and outdoor use as illustrated in FIGS. 19 through 21. In this arrangement, the home automation system 10' is shown to include a plurality of switches 16b' and 16c', which are substantially identical to the switches 16b and 16c of FIG. 1, except that their housing 70b' is sealed. In this regard, a first seal 300 seals the interface between the first and second housing shell halves 86b' and 88b' and a second seal 302 seals the interface between the first housing shell half 86b' and the housing cover 82b'. Each of the first and second seals 300 and 302 is illustrated to be an elastomeric seal, such as an O-ring, that is disposed in a corresponding seal ring groove 304. Alternatively, the first seal 300 may be overmolded over the first and second housing shell halves 86b' and 88b '.

Figure 22:
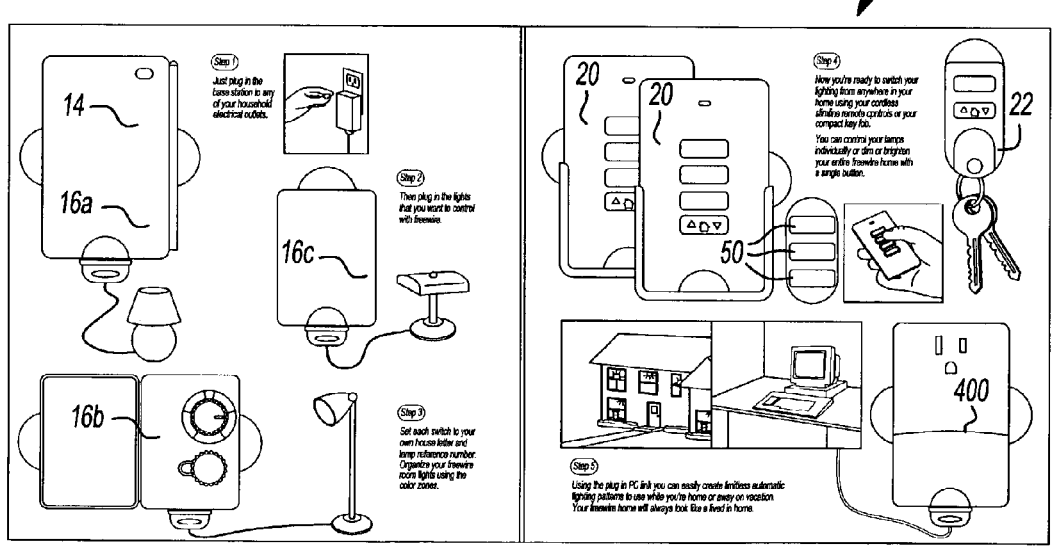
FIG. 22 is a schematic view of a home automation system constructed in accordance with the teachings of another preferred embodiment of the present invention, the home automation system being illustrated in a packaged condition.
Figure 23:
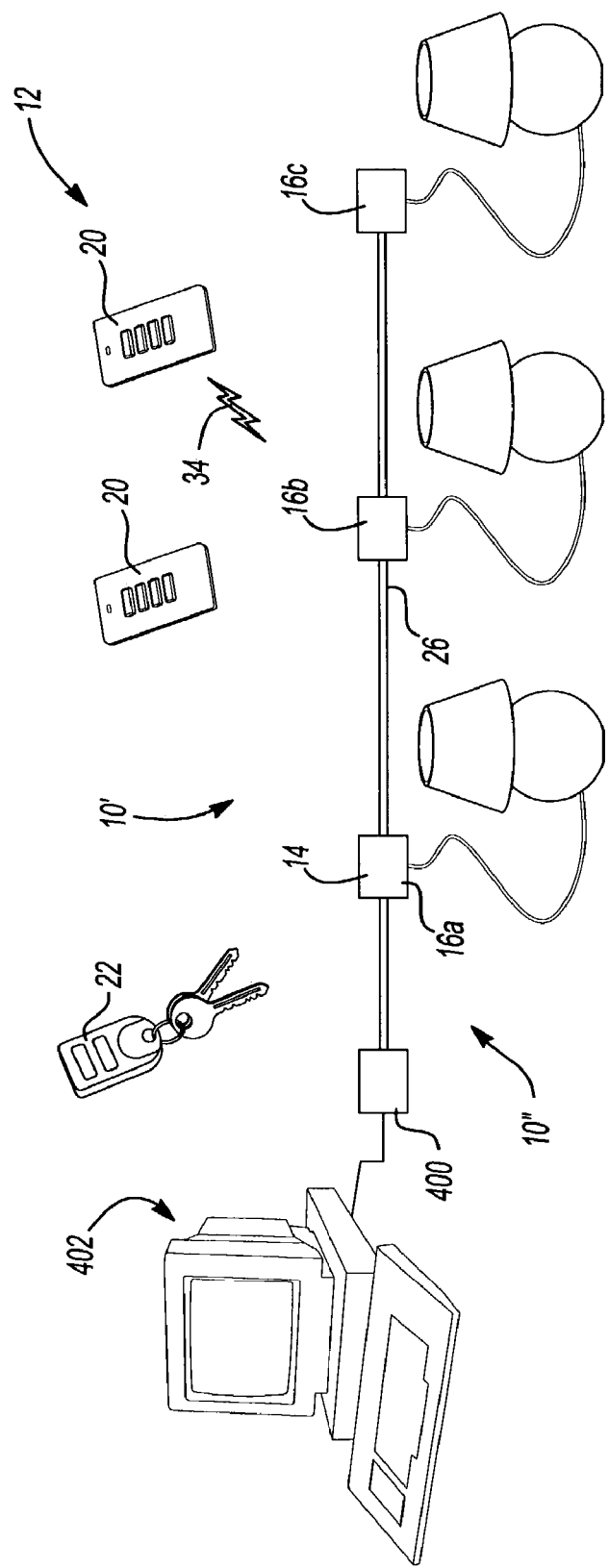
FIG. 23 is a schematic view of the home automation system of FIG. 22.

In the arrangement of FIGS. 22 and 23, the home automation system 10" is configured in a manner that is similar to the home automation system 10, except that a second hand-held transmitter 20 and a PC interface link 400 have been provided. The PC interface link 400 is configured to be coupled to a conventional personal computer (PC) 402, which permits the switches 16a, 16b and 16c of the home automation system 10" to be manually or automatically controlled via the PC 402. Manual control of the home automation system 10" is achieved when the user of the home automation system 10" manually accesses a software program and uses the software program to alter the state of one or more of the switches 16a, 16b and 16c in a desired manner. The PC interface link 400 receives data that is transmitted from the PC 402 and generates a message that is transmitted through the power wire system 26 in a manner that is described above. In this regard, the PC interface link 400 operates as a second messenger hub 14, except that the messages are generated in response to data from the software running on the PC 402, rather than from RF commands 34 that are generated by the transmitters 12, such as the hand-held transmitters 20 and key fob transmitter 22. Alternatively, the PC interface link 400 may include an RF transmitter for generating an RF command which is transmitted to the messenger hub 14. The messenger hub 14 would respond to the RF command as if it had been generated by one of the hand-held transmitters 20 or the key fob transmitter 22.

Figure 24:
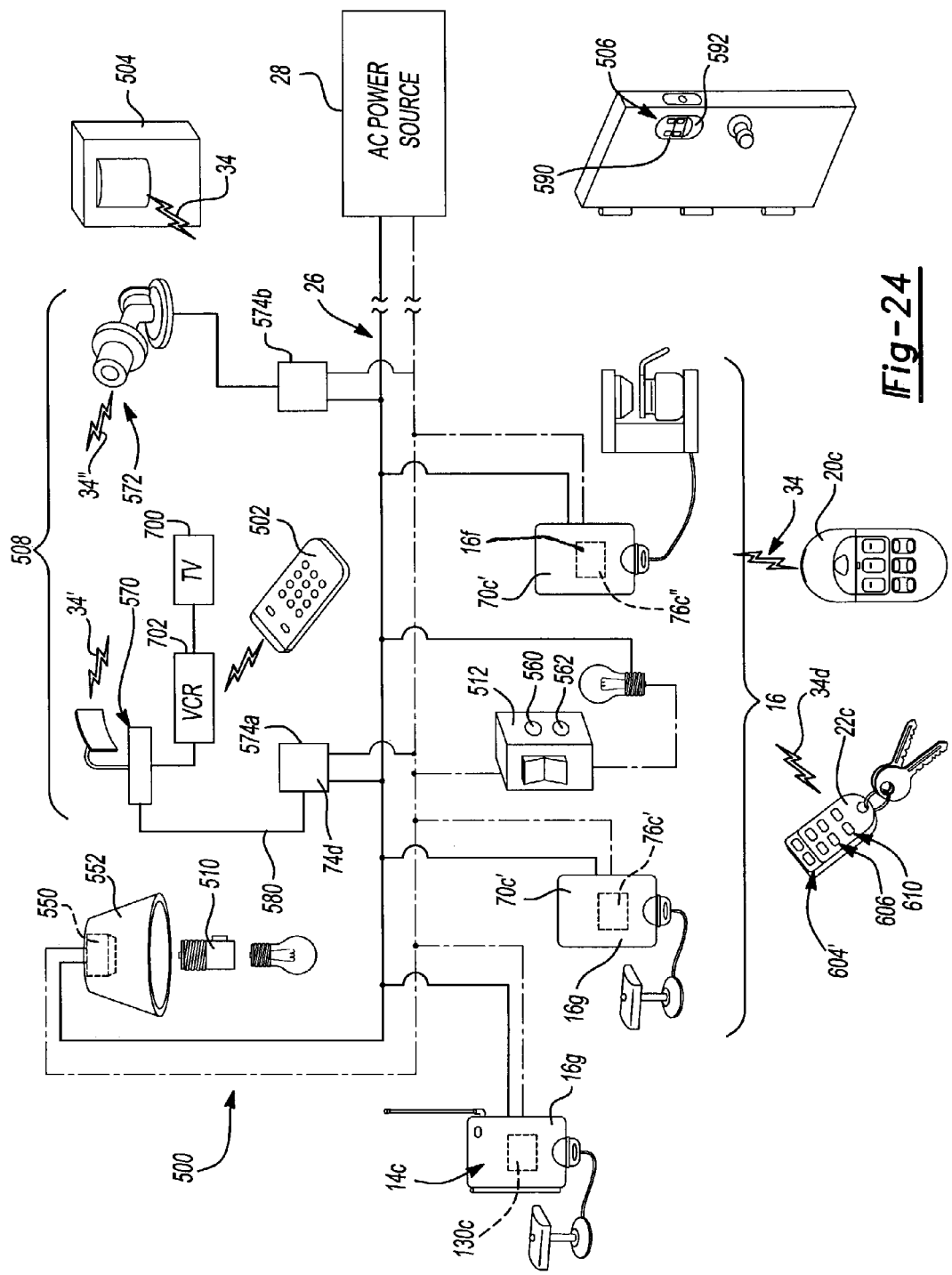
FIG. 24 is a schematic view of a home automation system constructed in accordance with the teachings of another preferred embodiment of the present invention.

A fourth home automation system 10c constructed in accordance with the teachings of the present invention is illustrated in FIG. 24. In the particular example provided, the home automation system 10c includes a messenger hub 14c, a plurality of devices 500, a remote transmitter 20c, a key fob transmitter 22c and a universal remote transmitter 502. The devices 500 include remotely controlled switches 16, a motion detector 504, a door lock 506 and a monitoring system 508. The switches 16 may be lamp switches 16g, appliance switches 16f, bulb receivers 510 and/or hardwire switches 512. Those skilled in the art will appreciate that home automation system 10c may be configured in various different ways and that some configurations may omit one or more of the aforementioned components and/or add one or more components that may not be specifically illustrated in the drawings or discussed herein.

Figures 25, 26:
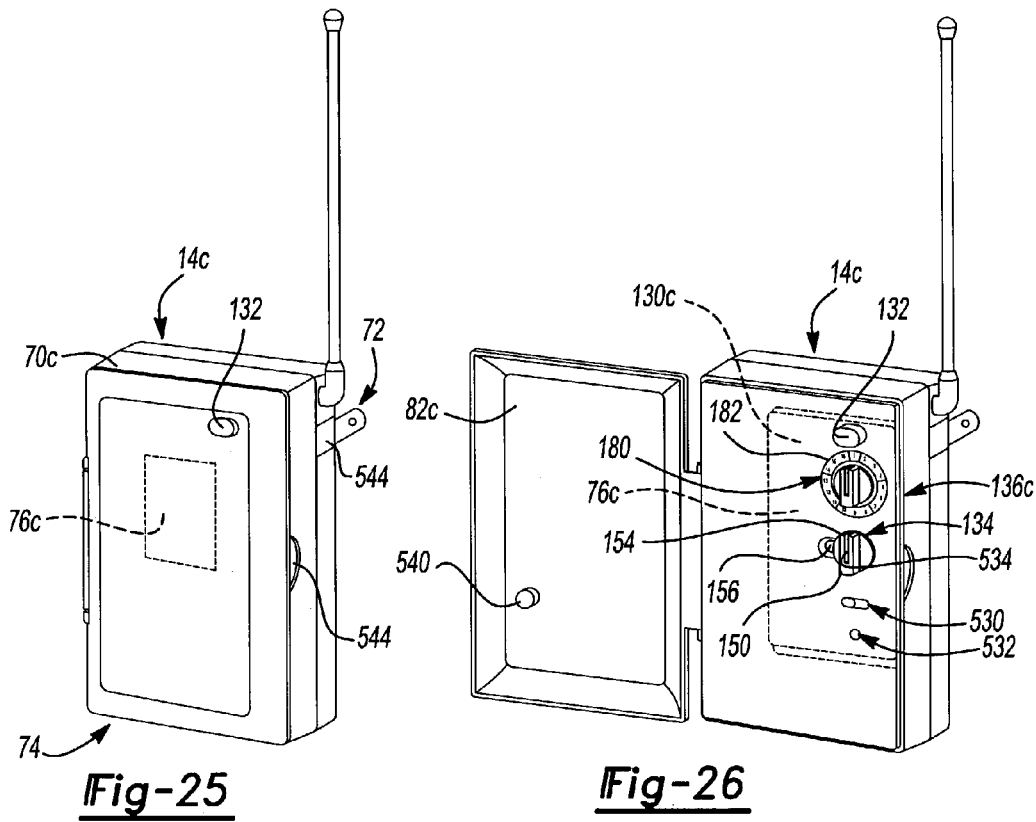
FIG. 25 is a perspective view of a portion of the home automation system of FIG. 24, illustrating the messenger hub in greater detail.
FIG. 26 is a view similar to FIG. 25 but illustrating the cover of the messenger hub in an open position.
Figure 27:
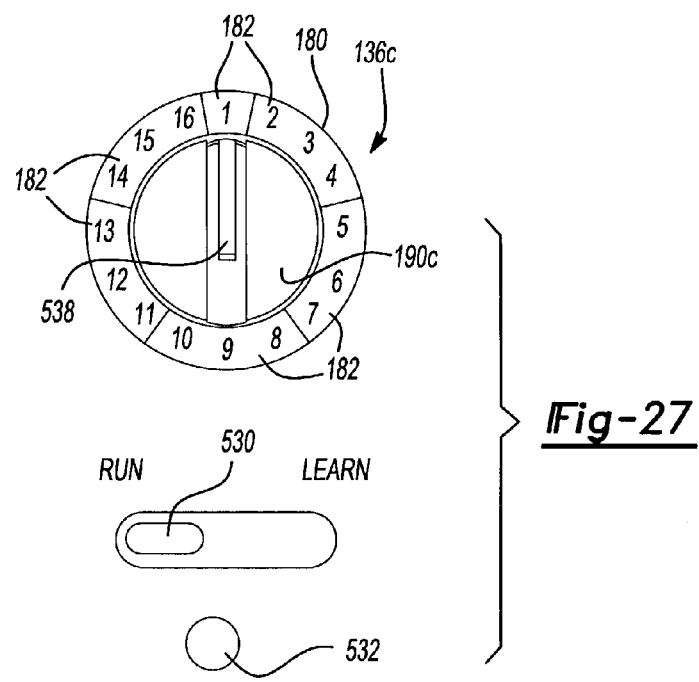
FIG. 27 is a front view of a portion of the messenger hub illustrating the configuration of the switch address selector in greater detail.

In FIGS. 25 and 26, the messenger hub 14c is illustrated to be generally similar to the messenger hub 14 illustrated in FIG. 10 and includes a housing 70c, a power input portion 72, an optional power output portion 74 and a controller 76c. The power input portion 72 and the power output portion 74 are configured as described above and as such, will not be discussed in further detail. The controller 76c includes a control unit 130c, a power button 132, a controller address selector 134, an optional switch address selector 136c, a run/learn switch 530 and an indicator light 532. The control unit 130c is generally similar to the control unit 130 described above but also includes programming capabilities that permit the user to associate various device addresses with one or more keys on the remote transmitter 20c, the key fob transmitter 22c and/or the universal remote transmitter 310, which will be discussed in further detail, below. The power button 132 and the controller address selector 134 are substantially similar to those described above except that flange portion 154 of the knob 150 of the controller address selector 134 includes a plurality of controller address indicia 156 (i.e., letter A through P instead of A through O), each of which corresponding to a predetermined controller address. Also, although the knob 150 is preferably configured to permit the controller address selector 134 to be adjusted without tools, the knob 150 in the example provided includes a tool receiving recess 534 that is adapted to receive an associated tool (not shown) that permits the user to adjust the controller address selector 134 with a tool. In the embodiment illustrated, the tool receiving recess 534 is a slotted aperture that is configured to receive the flat blade of a conventional slotted screwdriver.

The switch address selector 136c is generally similar to the switch address selector 136b that is described in conjunction with the switches 16a, 16b and 16c, above. More specifically, the switch address selector 136c is a multi-position binary switch that permits the user to assign a device address to the power output portion 74 of the messenger hub 14c without tools, such as screwdrivers. In the example provided, the knob 190c of the switch address selector 136c is, however, configured with a tool receiving recess 538 that is adapted to receive an associated tool (not shown) that permits the user to adjust the switch address selector 136c with a tool. In the embodiment illustrated, the tool receiving recess 538 is a slotted aperture that is configured to receive the flat blade of a conventional slotted screwdriver.

Each of the positions in the switch scale 180 is associated with a color-coded sector 182 that will be discussed in further detail, below. In the particular example provided, the position "1" is located in a red colored sector 182 and associated with a first device address, each of the positions "2", "3" and "4" is located in a gray colored sector 182 and associated with a second, third and fourth device address, respectively, each of the positions "5", "6" and "7" is located in a green colored sector 182 and associated with a fifth, sixth and seventh device address, respectively, each of the positions "8", "9" and "10" are located in a yellow colored sector and associated with an eighth, ninth and tenth switch device address, respectively, each of the positions "11", "12" and "13" are located in a blue colored sector 182 and associated with an eleventh, twelfth and thirteenth device address, respectively, and each of the positions "14", "15" and "16" are located in a black colored segment and associated with a fourteenth, fifteenth and sixteenth device address, respectively. Those skilled in the art will appreciate that any colors may be used to designate the various sectors 182, but in the example provided, the colors have been selected so as to permit persons with various forms of color blindness (e.g., red-green) to differentiate between the various colored sectors 182 of the switch scale 180.

The run/learn switch 530 is a slider-type switch in the example provided that permits a user to toggle the control unit 130c between a run mode, which permits the user to actuate a user programmed "mood" function, and a learn mode, which permits the user to program the "mood" function. The indicator light 532 is electrically coupled to the control unit 130c and provides a visual indication of the receipt of radio frequency data from a remote transmitter (e.g., the hand-held remote transmitter 20c). It will be appreciated that there can be alternate names for the "mood" functions, such as but not limited to "group" functions.

Figure 28:
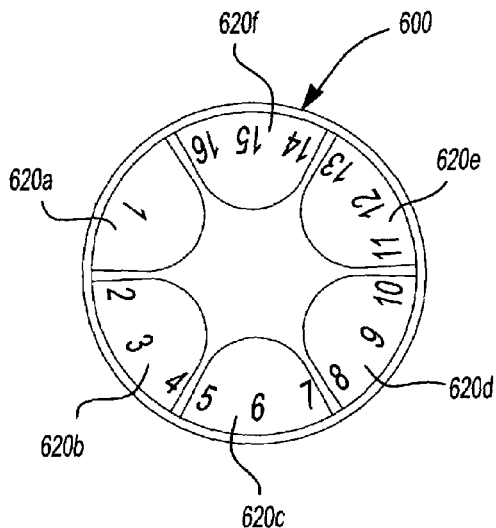
FIG. 28 is a front view of a portion of the messenger hub illustrating the configuration of the run/learn switch.

With reference to FIGS. 25, 26 and 28, the housing 70c is modified somewhat from the housing 70 described above so as to accommodate the switch address selector 136c, the run/learn switch 530 and the indicator light 532. Furthermore, a protrusion 540 is formed on the housing cover 82c and positioned thereon so as to contact the run/learn switch 530 if the housing cover 82c is closed against the housing assembly 80c while the run/learn switch 530 is in the learn position. The housing assembly 80c further includes recessed areas 544 that are positioned on the lateral sides of the housing assembly 80c to permit the user to grip the housing assembly 80c or the housing cover 82c as desired to withdraw the messenger hub 14c from an electrical outlet (not illustrated) or to open the housing cover 82c.

Returning to FIG. 24, the lamp and appliance switches 16g and 16f are configured almost identically to the switches 16a, 16b and 16c discussed above, except that the housing 70c' of the switches 16g and 16f includes recessed areas (not specifically shown) that are positioned on the lateral sides of the housing 70c' to permit the user to grip the housing 70c' or the housing cover 82c' as desired to withdraw the switch 16 from an electrical outlet (not illustrated) or to open the housing cover 82c'. In the example provided, the lamp switches 16g are configured to be employed only in conjunction with indoor incandescent lamps that draw a predetermined maximum amount of electrical energy, such as 300 watts of electrical power. Additionally, the control unit 76c' of the lamp switches 16g include a generic switch type address (i.e., a generic lamp switch address). In contrast, the appliance switches 16f may be employed with various indoor appliances (i.e., the appliance switches 16f are not restricted for use with only indoor incandescent lamps) that draw a predetermined maximum amount of electrical power, such as 500 watts of electrical power. The control unit 76c" of the appliance switches 16f include a generic switch type address (i.e., a generic appliance switch address), while the power input portion 72b' and power output portion 74b' of the appliance switch 16f are configured with a standard three conductor (i.e., grounded) configuration.

The bulb receivers 510 and hardwire switches 512 are similar to products that are commercially available from various sources such as the Socket Rocket and the Wall Switch Module, respectively, which are marketed by X10.com. Briefly, the bulb receiver 510 may be programmed via a remote transmitter (e.g., the hand-held remote transmitter 20c) by screwing the bulb receiver 510 into the socket 550 of a lamp 552, applying electrical power to the socket 550 and transmitting an RF signal 34 to the messenger hub 14c a predetermined number of times (e.g., 3 times). In response, the messenger hub 14c repetitively generates a message that causes the switches 16 having a common controller address and a device address associated with the RF signal 34 to enable the transmission of electrical power. When the bulb receiver 510 receives this message the predetermined number of times, the bulb receiver 510 will automatically "learn" both the controller address and a device address associated with the RF signal 34. Thereafter, the bulb receiver 510 can be operated by the user in a manner that is identical to that of the lamp and appliance switches 16g and 16f.

The hardwire switches 512 are functionally similar to the lamp switches 16g, and differ in that they are packaged in a way that permits them to be installed in a conventional electrical junction or outlet box (not shown) and coupled in the conventional manner that toggle switches are coupled the electrical wiring of a house (i.e., their power input and output portions are configured to be coupled directly to the wiring of the electrical power system 26). The hardwire switches 512 include a rotary controller address selector 560 and a rotary switch address selector 562 that permit them to be initialized in a manner that is identical to that of the lamp and appliance switches 16g and 16f.

The motion detector 504 is similar to products that are commercially available from various sources such as the EagleEye Indoor/Outdoor Motion Sensor and the ActiveEye Indoor/Outdoor Motion Sensor marketed by X10.com. Briefly, the motion detector 504, which is electronically programmable in a manner similar to that described above for the bulb receiver 510 to initialize it with a controller address and a device address, is a battery-powered motion detector that generates an RF signal 34, which when received by the messenger hub 14c may be employed to cause the messenger hub 14c to activate various other devices (e.g., switches 16 and/or the monitoring system 508) upon the sensing of motion. If no motion is sensed after a user settable amount of time has elapsed since the motion detector 504 last sensed motion, the motion detector 504 will generate another RF signal 34, which when received by the messenger hub 14c may be employed to cause the messenger hub 14c to deactivate the various devices that had been activated upon the sensing of motion.

The monitoring system 508 is similar to products that are commercially available from various sources such as the XCam2 Kit marketed by X10.com. Briefly, the monitoring system 508 includes a receiver 570 and a camera 572. In the particular example provided, each of the receiver 570 and the camera 572 include a power supply 574a and 574b, respectively, that permit these units to be electrically coupled to the power wire system 26. Alternatively, one or both of the receiver 570 and the camera 572 may be battery powered.

The power supply 574a for the receiver 570 is configured in a manner that is similar to the lamp and appliance switches 16g and 16f and may be initialized (i.e., set to a controller address and a device address) in a similar manner. The power output portion 74d, however, is configured with a power cord 580 that is configured to be coupled to the receiver 570. The power supply 574b for the camera 572 couples the camera 572 to a constant source of electrical power (i.e., the power supply 574b does not cycle power to the camera 572).

Upon activation of the power supply 574a by the messenger hub 14c (i.e., in response to the generation of a message by the messenger hub that includes a common controller address and a common device address), the receiver 570 generates an RF command 34' that causes the camera 572 to activate. The camera 572, which converts optical images into electronic data 34", sends the data 34" to the receiver 570 in an RF format. The receiver 570 converts the data from the RF format into a conventional video signal type, which may thereafter be transferred from the receiver 570 to a conventional video recorder (not shown) in a conventional manner. Deactivation of the power supply 574a similarly causes the camera 572 to cease the transmission of data. Alternatively, the power supply 574b may be activated by the messenger hub 14c (i.e., in response to the generation of a message by the messenger hub that includes a common controller address and a common device address) rather than via an RF command 34'.

The door lock 506 is similar to products that are commercially available from Kwikset of Lake Forest, Calif., such as the Kwikset Maximum Security Remote Keyless Entry Deadbolts and Handlesets. The door lock 506 is described in greater detail in U.S. patent application Ser. No. 09/062,156 entitled "Remotely Controlled Door Lock System", U.S. Pat. No. 5,857,365 entitled "Electronically Operated Lock" and WIPO International Application No. PCT/US00/21822 entitled "Remote Entry Lockset", the disclosures of which are hereby incorporated by reference as if fully set forth herein. Briefly, the door lock 506 includes a controller 590 and a lock 592. The lock 592 is conventionally movable between a locked condition and an unlocked condition and may be moved therebetween either manually or automatically by the controller 590 in response to an RF signal 34d generated by a hand-held remote transmitter (e.g., the hand-held remote transmitter 20c or the key fob transmitter 22c).

Like the hand-held remote transmitter 20, the remote transmitter 200 is conventionally operable for transmitting a plurality of RF signals 34 to communicate an RF command to the messenger hub 14. As those skilled in the art will appreciate from this disclosure, any wireless communication between various components of the home automation system 10 may be made via any type of electromagnetic energy. As such, the hand-held remote transmitter 20c, and the messenger hub 14 may be configured in the alternative to communicate via any other suitable form of electromagnetic wave communication. In the particular example illustrated in FIGS. 29 and 30, the remote transmitter 20c includes a housing 40c, an optional housing cover 40c' and a plurality of function switches 44c that include a selector wheel switch 600, a set of zone switches 602, a set of device address switches 604, first and second sets of mood switches 606 and 608, respectively, and a set of whole house switches 610.

Figure 29:
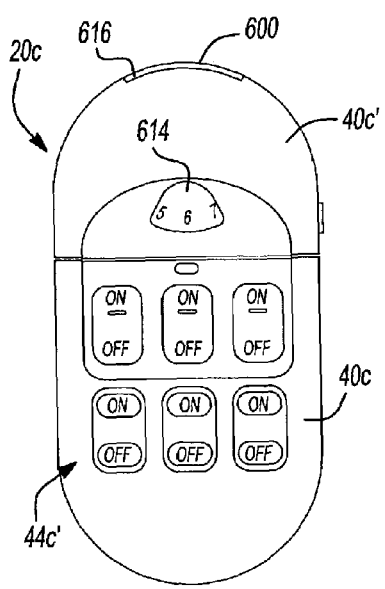
FIG. 29 is a front view of a portion of the home automation system of FIG. 24, illustrating the hand-held remote transmitter in greater detail.
Figure 30:
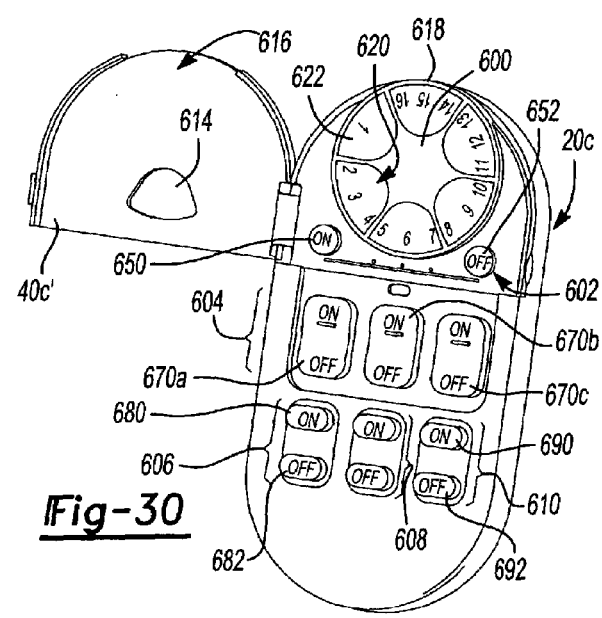
FIG. 30 is a perspective view of the hand-held remote transmitter with the cover in an open position.

The housing cover 40c' is movable between a closed position, which is illustrated in FIG. 29, and an open position, which is illustrated in FIG. 30. The housing cover 40c' includes a window 614, which permits the user to view the setting of the selector wheel switch 600 when the housing cover 40c' is placed in the closed position, and an access aperture 616. A portion of the selector wheel switch 600 extends through the access aperture 616 when the housing cover 40c' is closed to thereby permit the user to change the setting of the selector wheel switch 600 without opening the housing cover 40c'. The outer perimeter or edge 618 of the selector wheel switch 600 is preferably textured (e.g., reeded) to permit the user to more easily grip the selector wheel switch 600.

In the example provided, the selector wheel switch 600 is segregated into six different zones 620, with each zone 620 being identified by a color corresponding to an associated one of the sectors 182 on the switch scale 180. With reference to FIG. 31, each zone 620 further includes the indicia 622 of one or more of the switch positions that are associated with the switch scale 180 (a number from 1 to 16 in the example provided). In the embodiment provided, zone 620a is associated with the red colored sector 182 and includes indicia 622 designating its association with switch position "1", zone 620b is associated with the gray colored sector 182 and includes indicia 622 designating its association with switch positions "2" through "4", zone 620c is associated with the green colored sector 182 and includes indicia 622 designating its association with switch positions "5" through "7", zone 620d is associated with the yellow colored sector 182 and includes indicia 622 designating its association with switch positions "8" through "10", zone 620e is associated with the blue colored sector 182 and includes indicia 622 designating its association with switch positions "11" through "13" and zone 620f is associated with the black colored sector 182 and includes indicia 622 designating its association with switch positions "14" through "16". Placement of the selector wheel switch 600 into a desired or selected zone 620 aligns the zone 620 with the window 614 in the housing cover 40c' to thereby permit the user to view therethrough the color of the selected zone 620. Optionally, as illustrated in FIG. 29, the window 614 may be sized large enough to permit the user to also view the indicia 622 associated with the selected zone 620.

Returning to FIGS. 24 and 30, the set of zone switches 602, which are optional and include an "on" button 650 and an "off" button 652 in the example provided, permit the user to activate or de-activate all of the switches 16 associated with the selected zone 620 with a single touch of a button. More specifically, actuation of the "on" button 650 or "off" button 652 will generate an RF signal 34 that when received by the messenger hub 14c will cause the messenger hub 14c to generate a message that is transmitted through the power input portion 72 and over the power wire system 26. On receipt of this message, any of the switches 16 that have been set to a common controller address (i.e., the controller address of the switch 16 matches that of the messenger hub 14c) and a switch address that corresponds to any of the switch positions that are included in a colored sector 182 that matches the color of the zone 620. For example, if the selector wheel switch 600 were positioned in the blue zone 620e and the "on" button 650 were pressed, the messenger hub 14c would generate a message that would cause any of the switches 16 that were set to a common controller address and whose switch address selector 136b was placed in the blue colored sector 182 (i.e., to switch positions "11", "12" or "13" in the example provided) to enable the transmission of electrical power to the power output portion 74b of the switch 16. As we do not expect that the set of zone switches 602 will be used on a frequent basis, the we have arranged the hand-held remote transmitter 20c such that the set of zone switches 602 is covered by the housing cover 40c' when the housing cover 40c' is positioned in the closed position.

The device address switches 604, which are rocker-type switches 670a, 670b and 670c in the example provided, permit the user to independently activate or de-activate the switches 16 that have been assigned a switch position that corresponds with the indicia 622 on the selected zone 620 of the selector wheel switch 600. For example, rotation of the selector wheel switch 600 to the green zone 620e automatically associates the rocker-type switches 670a, 670b and 670c with switch positions corresponding to indicia "5", "6" and "7", respectively. Accordingly, rocking the rocker-type switch 670a to the "on" position in this example will generate an RF signal 34 that when received by the messenger hub 14c will cause the messenger hub 14c to generate a message that would cause any of the switches 16 that are set to a common controller address and whose switch address selector 136b was placed in the "5" position to enable the transmission of electrical power to the power output portion 74b of the switch 16. Likewise, rocking the rocker-type switch 670c to the "off" position in this example will generate an RF signal 34 that when received by the messenger hub 14c will cause the messenger hub 14c to generate a message that would cause any of the switches 16 that are set to a common controller address and whose switch address selector 136b was placed in the "7" position to disable the transmission of electrical power to the power output portion 74b of the switch 16.

With regard to the setting of the selector wheel switch 600 to the red zone 620a, which includes a single indicia 622 designating its association with a switch position of "1", the rocker-type switches 670a and 670c are inoperative, so that only rocker-type switch 670b may be employed to activate or de-activate switches 16 that are set to a common controller address and whose switch address selector 136b was placed in the "1" position. Alternatively, the hand-held remote transmitter 20c may be configured such that each of the rocker-type switches 670a, 670b and 670c may be employed to activate or de-activate switches 16 that are set to a common controller address and whose switch address selector 136b was placed in the "1" position.

The first and second sets of mood switches 606 and 608 are generally similar and as such, only the first set of mood switches 606 will be discussed in detail. The first set of mood switches 606 includes an "on" button 680 and an "off" button 682 in the particular example illustrated that permit the user to control the operation of one or more switches 16 that are associated with one or more predetermined device addresses. As noted above, the "mood" function is user programmable so that the user may select the device addresses (up to a predetermined maximum quantity) that are to be controlled.

To program the "mood" function associated with the first set of mood switches 606, the run/learn switch 530 on the messenger hub 14c is placed in the learn position (with the messenger hub 14c coupled to the power wire system 26) and the "on" button 680 associated with the first set of mood switches 606 is pressed to thereby transmit an RF signal 34 to the messenger hub 14c to indicate that the "mood" function for the first set of mood switches 606 is to be programmed. The indicator light 532 on the messenger hub 14c, which is maintained normally in a constant or steady illuminated condition, will flicker as data is being transmitted to and processed by the control unit 130c. Once the indicator light 532 returns to the steady illuminated condition (i.e., when it no longer flickers), the control unit 130c is ready to be programmed with up to a predetermined maximum number of device addresses (in the example provided, the predetermined maximum number of device addresses is four).

To program a device address, the user rotates the selector wheel switch 600 as necessary to a desired zone 620 to associate the device address switches 604 with indicia 622 associated with desired switch positions (which thereby associates the device address switches 604 with corresponding device addresses). Thereafter, the user rocks a rocker-type switch (i.e., rocker-type switches 670a, 670b or 670c) to the "on" position to transmit an RF signal 34 to the control unit 130c that causes the control unit 130c to associate a particular device address with the "mood" function. Thereafter, the user may rotate the selector wheel switch 600 as necessary and rock one of the rocker-type switches to the "on" position when the indicator light 532 has returned to a steady illuminated condition to associate another particular device address with the "mood" function. Once the "mood" function has been programmed, the user switches the run/learn switch 530 to the run position. Thereafter, when the "on" or "off" buttons 680 and 682 of the first set of mood switches 606 are actuated, the control unit 130c of the messenger hub 14c will generate messages which cause any of the switches 16 associated with the preprogrammed "mood" function to enable or disable, respectively, the transmission of electrical power to the power output portion 74b of the switch 16.

To further illustrate the setting of a "mood" function, a non-limiting example is provided herein. With the messenger hub 14c prepped (i.e., the messenger hub 14c coupled to the power wire system 26 and the run/learn switch 530 set to the learn position), the user depresses the "on" button 680 associated with the second set of mood switches 608 to thereby initiate the programming of the second "mood" function. In this example, it is desired to program the second "mood" function with device addresses that are associated with switch positions "9", "11", "12" and "16". Accordingly, the user rotates the selector wheel switch 600 to the yellow zone 620d and rocks the rocker-type switch 670b to the "on" position. The user then rotates the selector wheel switch 600 to the blue zone 620e and (when the indicator light 532 has returned to a steady illuminated condition) rocks the rocker-type switch 670a to the "on" position, waits for the indicator light 532 to return to a steady illuminated condition, and then rocks the rocker-type switch 670b to the "on" position. Thereafter, the user rotates the selector wheel switch 600 to the black zone 620f and (when the indicator light 532 has returned to a steady illuminated condition) rocks the rocker-type switch 670c to the "on" position. When the indicator light 532 has returned to a steady illuminated condition, the user returns the run/learn switch 530 to the run position and thereafter can activate or deactivate devices (e.g., switches 16) that are set to a controller address that is common with that to which the messenger hub 14c has been set and whose device address is set to device addresses corresponding to the switch positions "9", "11", "12" and "16".

To further illustrate the programming of the "mood" function in the particular embodiment provided, assume that prior to switching the run/learn switch 530 to the run position in the preceding example, the user rocks the rocker-type switch 670b to the "on" position. As the maximum number of device addresses that can be associated with a "mood" function in this example has been identified as being four, the control unit 130c would effectively delete the first entered device address associated with the particular "mood" function and store the newly entered device address. In this example, the control unit 130c would effectively delete the device address associated with the switch position "9" and program a switch position of "15" (so that the second "mood" function would be programmed to device addresses corresponding to the switch positions "11", "12", "16" and "15".

The set of whole house switches 610 is illustrated in the example provided to include an "on" button 690 and an "off" button 692. Actuation of the "on" button 690 generates an RE signal 34 that when received by the messenger hub 14c causes the messenger hub 14c to generate a message that causes a predetermined first set of device types to activate, which in the particular example provided, consists only of lamp switches 16g that are set to a controller address that is common with that to which the messenger hub 14c is set. In contrast, actuation of the "off" button 692 generates an RF signal 34 that when received by the messenger hub 14c causes the messenger hub 14c to generate a message that causes a predetermined second set of device types to deactivate, which in the particular example provided, consists of both lamp switches 16g and appliance switches 16f that are set to a controller address that is common with that to which the messenger hub 14c.

Returning to FIG. 24, the key fob transmitter 22c is generally similar to the key fob transmitter 22 of FIG. 1 except that it is configured with a set of device address switches 604', a first set of mood switches 606, a set of whole house switches 610 and a set of door lock switches 696. The first set of mood switches 606 and the set of whole house switches 610 are substantially similar to that which are described above in conjunction with the hand-held remote transmitter 20c and as such, need not be described in further detail. In the example provided, the device address switches 604' includes a single set of preprogrammed switches that are associated with a predetermined device address, such as the device address that corresponds to a switch position of "1". The device address switches 604' may be associated with a given messenger hub 14c or the messenger hub 14c may be initialized in a conventional and well known manner to accept RF commands 34 from one or more particular key fob transmitters 22c. The door lock switches 696 are configured to transmit RF commands 34d that are accepted by the controller 590 of the door lock 506 to thereby permit the user to remotely lock and unlock a door (not shown).

The universal remote transmitter 502 is similar to products that are commercially available from various sources such as the Platinum Remote marketed by X10.com. Briefly, the universal remote transmitter 502 may be employed to control various electronic components, such as televisions 700, video cassette recorders 702, DVD players, laser disk players, satellite receivers, stereo receivers, cassette decks, compact disk players, etc., as well as the various devices 500 of the home automation system 10c. In the particular example provided, the universal remote transmitter 502 includes a pre-programmed memory into which the infrared (IR) command structure for controlling various commercially available electronic equipment (e.g., televisions, etc.) has been stored. To associate the universal remote transmitter 502 with a particular device, the user need only switch the universal remote transmitter 502 into a "learn" mode wherein a button (e.g., a button labeled TV) is associated with an appropriate IR command structure. Alternatively or additionally, the universal remote transmitter 502 may "learn" various IR commands directly from a remote transmitter that has been provided with the electronic device. Such learning techniques are well known in the art and as such, need not be set forth in detail herein. Those skilled in the art will appreciate that the teachings of the present invention may be incorporated into the universal remote transmitter 502 to improve its functionality and convenience. For example, the universal remote transmitter 502 may additionally be equipped with mood function switches, whole house function switches and a selector wheel switch or an equivalent thereof that permits the user to quickly and easily associate the RF commands that are generated with a desired device address.

While the invention has been described in the specification and illustrated in the drawings with reference to various preferred embodiments, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A home automation system comprising:
a messenger hub having a power input portion and a controller, the power input portion of the messenger hub including a pair of terminals that are adapted for coupling to an electrical power line, the controller of the messenger hub being configured to selectively generate an electronic message that is transmitted through the electrical power line; and
a remotely controlled switch having a power input portion, a power output portion, a controller and a housing, the power input portion of the remotely controlled switch including a pair of terminals that are adapted for coupling to the electrical power line and receiving the electronic message, the controller of the remotely controlled switch being coupled to the power input portion of the remotely controlled switch and configured to selectively enable or disable transmission of electrical power between the power input portion of the remotely controlled switch and the power output portion in response to the electronic message, the housing having first and second portions, which cooperate to define a cavity into which the controller of the remotely controlled switch is housed, and a seal member that is disposed between the first and second portions.

2. The home automation system of claim 1, wherein the housing further comprises a cover and a cover seal, the cover being hingedly coupled to one of the first and second portions and movable between an open position, which provides access to the controller of the remotely controlled switch, and a closed position, the cover seal being employed to form a seal between the cover and the one of the first and second portions.

3. A home automation system comprising:
a plurality of remotely controlled switches, each of the remotely controlled switches being settable to a selected device address;
a messenger hub that is configured to transmit messages through an electrical power line for controlling the remotely controlled switches; and
a hand-held remote transmitter for transmitting commands to the messenger hub, the messenger hub being responsive to the commands to activate one or more of the remotely controlled switches, the hand-held remote transmitter including:
a first switch having a plurality of zones, each of the zones being associated with a set of device addresses, the first switch being selectively positionable into a desired zone, the set of device addresses including one or more of the device addresses to which the remotely controlled switches may be set; and
at least one second switch, each second switch being associated with a single device address in the set of device addresses such that operation of one of the second switches causes the hand-held remote transmitter to generate a command that causes the messenger hub to generate a message to activate any remotely controlled switch that has been set to a device address corresponding to the single device address.

4. The home automation system of claim 3, wherein changing the first switch to another desired zone associates each second switch with a different set of device address.

5. The home automation system of claim 3, wherein the first switch is a rotary switch.

6. The home automation system of claim 3, wherein a maximum quantity of device addresses that may be included in the set of device addresses is equal to a quantity of the second switches.

7. The home automation system of claim 3, wherein the set of device addresses associated with the desired zone includes only one device address and each of the second switches is associated with the only one device address.

8. The home automation system of claim 3, wherein the hand-held remote transmitter further comprises a zone switch, the zone switch being associated with each of the device addresses in the set of device addresses such that operation of the zone switch causes the hand-held remote transmitter to generate a command that causes the messenger hub to generate at least one message to activate any remotely controlled switch that has been set to a device address corresponding to one of the device addresses in the set of device addresses.

* * * * *

UNITED STATES PATENT AND TRADEMARK OFFICE
Certificate

Patent No. 7,082,339 B2                                                Patented: July 25, 2006

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Christopher Murray, Baltimore, MD (US); Cory Sorice, Towson, MD (US); James R. Raskin, Ellicott City, MD (US); Carolyn M. Martin, Baltimore, MD (US); and William Frederick, Bel Air, MD (US).

Signed and Sealed this Twenty-fifth Day of March 2008.

*DAVID VINCENT*
*Supervisory Patent Examiner*
*Art Unit 2129*